United States Patent [19]

Roberts

[11] 3,911,121

[45] Oct. 7, 1975

[54] TERPENE PHENOL RESIN COMPOSITIONS CONTAINING ORGANOPHOSPHORUS INSECTICIDES

[75] Inventor: Lyman Richard Roberts, Modesto, Calif.

[73] Assignee: Shell Oil Company, Houston, Tex.

[22] Filed: Sept. 6, 1974

[21] Appl. No.: 504,007

Related U.S. Application Data

[63] Continuation-in-part of Ser. No. 412,996, Nov. 5, 1973, abandoned.

[52] U.S. Cl. ............ 424/219; 424/78; 424/211; 424/212; 424/213; 424/218; 424/225
[51] Int. Cl.² ............................................ A01N 9/36
[58] Field of Search ............ 424/78, 211, 212, 213, 424/218, 219, 222, 225

[56] References Cited
UNITED STATES PATENTS

| 2,966,440 | 12/1960 | Gerolt | 424/78 |
| 3,130,120 | 4/1964 | Schultz | 424/219 |
| 3,318,769 | 5/1967 | Folckemer et al. | 424/219 X |

OTHER PUBLICATIONS

Encyclopedia of Chem. Technology, Kirk–Othmer, Vol. 13, 1954, pp. 726 & 731.
The Condensed Chemical Dictionary–8th Ed., 1971, pp. 618 & 693.

Primary Examiner—Leonard Schenkman

[57] ABSTRACT

This invention relates to pesticidal compositions, each comprising essentially one or more of certain organophosphorus pesticides intimately admixed with a terpene phenol resin of certain characteristics, the compositions being characterized by providing effective pesticidal activity over extended periods of time, even when applied as a film or in the form of small particles on surfaces and in substrates that otherwise would mask, decompose and/or promote decomposition of the pesticide, thus destroying it effectiveness.

4 Claims, No Drawings

TERPENE PHENOL RESIN COMPOSITIONS CONTAINING ORGANOPHOSPHORUS INSECTICIDES

This application is a continuation-in-part of application Ser. No. 412,996, filed Nov. 5, 1973, now abandoned.

BACKGROUND OF THE INVENTION

There are many situations where it is desirable to control insects at a locus where free movement of air ordinarily occurs, as on patios, in barns, sheds, feed lots, pens and the like, on plants and on soil. Fumigant-type insecticides are not ordinarily effective in such situations because of the difficulty in attaining and maintaining an insectidally effective dosage of the insecticide; reinfestation of the locus by insects usually occurs soon after the insecticide has been applied. Such loci are best protected by applying an insecticide to one or more surfaces bounding, or within, the locus to be protected from insects. To prevent rapid reinfestation, it is necessary to use an insecticide having a long residual life. However, the use of residual insecticides, such as chlorinated hydrocarbons, is currently in disfavor, due to the alleged buildup of such insecticides in the environment and in animal tissues.

Various organophosphorus insecticides are well known for their high activity in controlling insects. In general, such insecticides are non-residual, being hydrolytically unstable and/or volatile, and do not build up in animals or the environment, thus presenting fewer environmental problems.

In particular, volatile beta-halovinyl phosphate insecticides are well known for their outstanding activity in controlling insects within an enclosed locus or when placed in a position next to the object to be protected. These volatile pesticides need present no environmental problems because they can be formulated to be released to the environment in quantities that are harmless to animal life but toxic to insects. Moreover, these compounds are rapidly metabolized or broken down in an animal body into relatively harmless substances leaving no accumulated residue in body tissues.

However, it is often difficult to exploit the inherent effectiveness of organophosphorus insecticides.

a. Many tend to be sensitive to water, such as moisture in the air or soil, decomposing hydrolytically to inactive materials.

b. Many are sensitive to surfaces on which they are applied.
   i. some surfaces tend to promote their reactivity to water; and
   ii. some surfaces (particularly in soil) cause their decomposition.

c. Some surfaces tend to mask the effect of the insecticide, absorbing or adsorbing it, so that it is not available to insects. Soil may also have this effect.

d. Some of the most effective insecticides for controlling flying insects, such as flies in and around houses, barns, sheds, pens and feed lots and/or on animals, are so volatile that it is very difficult to maintain them at a locus to be protected for long enough time for them to be effective against the insects.

e. Most are quite toxic, requiring special handling techniques to avoid injury to the person applying them, or others working in the area where they have been applied.

To overcome these drawbacks and realize the inherent effectiveness of these insecticides, it is known to incorporate them in resin matrices, from which they slowly and continuously pass to the surface, becoming available in amounts which control the insects but are non-toxic to humans and warm-blooded animals.

Typical compositions of this kind are disclosed in U.S. Pat. Nos. 3,318,769, 3,076,744 and 3,223,513 and Canadian Pat. Nos. 701,470 and 755,683.

Broadly speaking, for a resin to be suitable for this purpose, it must have the following characteristics.

1. It must not cause degradation of the insecticide;
2. It must be physically compatible with the insecticide — that is, it must readily mix with the insecticide to form a stable, uniform (molecular) dispersion of the insecticide throughout the resin matrix, from which dispersion the insecticide does not separate spontaneously as a pure separate phase as by syneresis, or when subjected to pressure (e.g., when the composition is squeezed).
3. It must protect the insecticide from the effects of water (condensed moisture, moisture in the air, wash water, water in formulations, etc.); the composition made from the resin must be chemically and physically stable to moisture; it must be non-porous and hydrophobic; it must provide this protection when the composition is applied as a film or as small particles;
4. It and compositions made from it must be stable with respect to surfaces to which they are applied and must protect the insecticide from any adverse effect the surface might have; they must provide this protection when the composition is applied as a film or as small particles;
5. Compositions made from it must be easy to formulate into formulations having any desired physical shape or condition; such a composition must be capable of being formulated as a solution suspension, emulsifiable concentrate, or other liquid formulation, or as a powder, dust or other particulate formulation, to give the desired form (film, droplets, particles) on the surface to which it is to be applied;
6. Compositions made from it must control evolution of the insecticide from the body of the composition to its surface, where it is available to control insects, only at the rate necessary to provide such control; it must do this even though the composition is in the form of a thin film or small particles.

Prior art compositions are not suitable for applications in which they are used in a form having high area-to-volume ratios, as in films or small particles, failing to meet criteria (3), (4) and (6). They provide the necessary insecticide release rates and protection for the insecticide when the composition is in a form having a low area-to-volume ratio, but release the insecticide much too rapidly and fail to protect it from moisture and/or the effects of surfaces when the composition has a high area-to-volume ratio. Accordingly, such compositions are not suitable for controlling insects at loci which are not enclosed and/or through which air is free to circulate.

Also, such compositions are not suitable for application to crops and other plants, or to soil, where the composition is on the plant or on and/or in soil in the form of a film or small particles.

DESCRIPTION OF THE INVENTION

It has now been found that terpene phenol resins having certain characteristics are uniquely superior as the resin matrix for extending the effective life of certain organophosphorous insecticides, releasing the insecticide at useful rates and protecting it from the effect of moisture and/or surfaces even when the resin/insecticide composition is in a form having a high surface-to-volume ratio, as in films or small particles.

Since mixtures of these insecticides, as well as single species thereof, are contemplated in the invention, the term "insecticide" as used herein include mixtures of the defined insecticides, as well as the individual insecticides.

The organophosphorus insecticides contemplated in this invention are organophosphates and their sulfur analogs of the following formulae (classes):

(1)

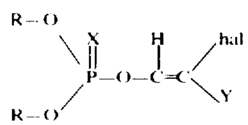

(2)

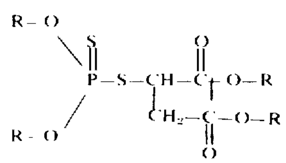

(3)

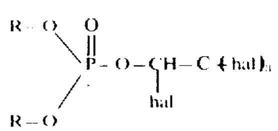

(4)

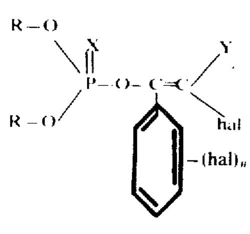

(5)

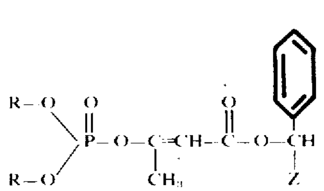

(6)

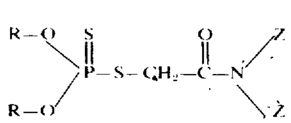

-Continued (7)

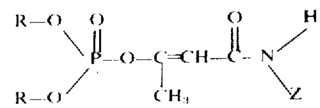

(8)

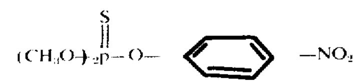

(9)

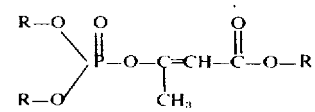

wherein each R, which may be the same or different, represents alkyl of from 1 to 10, preferably 1 to 4, carbon atoms, X is oxygen or sulfur, Y is hydrogen or middle halogen (i.e., Cl or Br), Z is hydrogen or alkyl of from one to four carbon atoms, "hal" is middle halogen, and $n = 2$ or 3.

Typical, exemplary species of the formulations of this invention are set forth hereinafter in this specification.

Certain classes of organophosphorus insecticides are of particular interest in this invention. Activity, volatility and hydrolytic stability vary from class to class, even from species to species. In the present invention, some respond more favorably and exhibit longer effective life than others, in that their residual activity is extended more by formulation with resins of this invention. In no case is the residual activity of any of the classes or their members lessened by formulation with such resins, and in most cases the residual activity is considerably enhanced thereby. In all cases, the insecticide is protected from adverse moisture and/or surfaces and safety in handling it is provided.

The classes of organophosphorus insecticides of particular interest are as follows:

*a.* Compounds of class (4) above, typical species of this class being:

O-[2-chloro-1-(2,5-dichlorophenyl)vinyl]

O,O-diethyl phosphorothioate; the corresponding dimethyl ester;

2-chloro-1-(2,4,5-trichlorophenyl)vinyl dimethyl phosphate; the corresponding diethyl ester; and 2-chloro-1-(2,4-dichlorophenyl)vinyl diethyl phosphate; the corresponding dimethyl ester;

*b.* Compounds of class (3), typical species of this class being;

1,2-dibromo-2,2-dichloroethyl dimethyl phosphate.

*c.* Compounds of class (5), typical species of this class being:

2-(α-methylbenzyloxycarbonyl)-1-methylvinyl dimethyl phosphate.

*d.* Compounds of class (9), typical species of this class being:

dimethyl 2,2,2-trichloro-1-hydroxyethylphosphonate.

*e.* Compounds of class (1), typical species of this class being:

2,2-dichlorovinyl dimethyl phosphate.

O-(2,2-dichlorovinyl) O,O-dimethyl phosphorothioate.

2-chlorovinyl diethyl phosphate.

2,2-dichlorovinyl methyl octyl phosphate.

Of particular interest are the compositions of this invention wherein the insecticide is a beta-halovinyl dialkyl phosphate — i.e., class (1), a supra, especially the subclass wherein X is oxygen. Because of its characteristics, the most preferred species of this subclass is 2,2-dichlorovinyl dimethyl phosphate, commonly known as DDVP.

Also of particular interest are the compositions wherein the insecticide is of class (4), especially the subclass wherein each R is methyl or ethyl, X is oxygen and Y is hydrogen, $n$ is 2 or 3, and hal is chlorine.

The resins contemplated as the matrices in this invention are terpene phenol resins having a softening point (ring and ball method) of 100°C or higher and a phenolic hydroxyl value of about 0.14 equivalent per 100 grams of resin, or higher, measured by the procedures outlined by Kucharsky and Safaric in "Titrations of Non-aqueous Solutions", Elsevier, 1965, pages 216 and 217, Methods C & D. It is preferred that the softening point be above about 120°C and the phenolic hydroxyl value be about 0.2 equivalent per 100 grams of resin.

These terpene phenol resins, which themselves are well known in the art, are generally pale, hard, thermoplastic friable resins and are the resinous condensation products of a terpene and a phenol, typically a mono- or bicyclic monoterpene hydrocarbon and a monocyclic monohydric phenol. They may be prepared by reacting various terpenes, such as dipentene, $\alpha$-pinene, limonene and various turpentine cuts comprising predominantly these and/or other mono- or bicyclic monoterpene hydrocarbons with phenols, such as phenol, cresol, alkylated phenols, for example normal butyl phenol, tertiary butyl phenol, propyl phenol and the like in the presence of an ionic or condensation catalyst such as sulfuric acid, a sulfonic acid, aluminum chloride, boron trifluoride, or the molecular compounds of boron trifluoride with ethers, acids, alcohols and phenols as disclosed in U.S. Pat. No. 2,343,845, to which express reference is hereby made; see also Kirk-Othmer, "Encyclopedia of Chemical Technology," First Edition, Volume 13, pages 725–6, to which express reference also is made. These terpene phenol resins which are employed in the compositions of the present invention are soluble in a variety of organic solvents and have varying degrees of solubility in hydrocarbon solvents. Suitable terpene phenol resins may be prepared by reacting as much as 5 parts of the terpene or mixture of terpenes with one part of the phenol, although lower proportions, bearing in mind that the hydroxyl value of the resinous product will be a function of the ratio of terpene to phenol employed and that this ratio should be adjusted, as can readily be ascertained by those skilled in the art, to yield a resinous product having the desired hydroxy value. Particularly suitable are the "terpene phenol" resins sold under the tradename NIREZ Series 2000 Resins, by Newport Division of Reichhold Chemicals, Inc.

As has already been pointed out herein, one of the principal shortcomings of the prior art matrices has been the fact that when the final composition is used in the form of a film, or as small particles, having a high area-to-volume ratio, they release the insecticides too rapidly. It appears that in such compositions, movement of the insecticides from the body of the composition to its surface is solely by diffusion, and this mechanism would predict increase in release rate with increase in the area-to-volume ratio, provided the insecticide does not build up on the surface of the composition. In the case of the prior art compositions, once at the surface, the insecticide apparently is free to leave. If volatile, it vaporizes substantially at the rate it appears at the surface. If solid, it merely lies on the surface, free to be removed by contact with the insect, or some physical force such as vibration, rubbing, or the like.

However, in the case of the terpene phenol resin compositions of this invention, release of the insecticide does not appear to be controlled by diffusiosn alone, the release rate being much slower than would be the case if it were only diffusion-controlledd. Thus, when a volatile insecticide such as DDVP is mixed with such a resin, the vapor pressure of the insecticide in the mixture is much lower than that which would be expected from Raoult's law for a simple solution of the insecticide in the resin. Even in a fresh deposit of a resin/DDVP mixture, which may be quite soft because of the relatively low resin/DDVP ratio, the escaping tendency of the DDVP is low; as DDVP escapes, the deposit hardens and the escaping tendency of the DDVP is further reduced.

Apparently, the insecticide and resin interact by hydrogen bonding to form a complex, with the mixture being at equilibrium between complex at the surface and complex within the body of the composition. When the insecticide/resin composition is exposed to the atmosphere or to an aqueous medium, exposing complex on the surface of the composition, reaction occurs, hydrogen bonds breaking and freeing molecules of the insecticide. These free insecticide molecules then are available for controlling insects. Then inevitably such free insecticide molecules are lost from the surface of the composition: by contact with an insect and/or by vaporization if the insecticide is volatile, or as the result of mechanical forces (vibration, rubbing or the like) if the insecticide is an essentially non-volatile liquid or solid. Loss of the molecules of free insecticide appears to disturb the equilibrium causing breakage of hydrogen bonds in complex in the body of the composition to yield molecules of free insecticide which then migrate by diffusion to the surface where they form complex to re-establish the equilibrium.

The rate at which free insecticide molecules are made available at the surface of the composition thus appears to depend upon three factors: (a) the rate at which complex at the surface of the composition is broken down; (b) the rate at which hydrogen bonds in complex in the interior of the composition break; and (c) the rate at which free insecticide molecules diffuse from the interior to the surface of the composition. The rate at which complex at the surface reacts appears to be relatively slow; so does the rate at which hydrogen bonds in complex in the interior break. Further, since the terpene phenol resin matrix is a hard, highly viscous organic glass, the rate at which molecules of free insecticide diffuse through the resin is relatively slow. As a result of these three factors, the rate at which free molecules of the insecticide are made available to control insects is much slower than the rate provided by prior art compositions. Accordingly, the resin compositions of this invention are suitable for use in the forms of films or small particles whereas the prior art compositions are not.

However, whatever the reason or mechanism involved, the terpene resin compositions release the insecticide at desired rates when in a form having a high surface-to-volume configuration (i.e., film or small particles) as well as when in a form having a low surface-to-volume relationship. Accordingly, these new compositions enable efficient utilization of the insecticide in situations wherein the prior art compositions cannot be used.

The second significant shortcoming of prior art resin compositions is the fact that, when in a form having a high surface-to-volume ratio, they do not protect the insecticide from moisture and from the adverse effects of surfaces to which the composition is applied. In contrast, the resin compositions of this invention protect the insecticide under such conditions. The resins readily mix with organophosphorus insecticides to form what appear to be essentially uniform dispersions of the molecules of the insecticide (as the complex) in the resin. The resin matrix itself is a highly viscous organic glass which is stable to water. It and the insecticide compositions prepared from it are hydrophobic, so that the composition is not wet by water, nor is it soluble in, or permeable to, water. Since the resin/insecticide complexes appear to be relatively stable to moisture and to the effect of surfaces on which the composition is applied, these resins protect the insecticide from the adverse effects of moisture, even when in a form having a high surface-to-volume ratio.

Otherwise, the terpene phenol resins meet all of the criteria set out above for a useful resin matrix. The resins themselves do not cause degradation of the insecticide. The resin compositions do not react with surfaces which they contact, and protect the insecticide from any adverse effect that such surfaces might have upon the insecticide.

The compositions of this invention thus meet all of the criteria for a practical, useful composition for prolonging the effective life of an organophosphorus insecticide, even when the composition is in the form of a film, small particles, or other form having a high area-to-volume ratio.

The compositions of this invention can be prepared and formulated in a number of ways and applied by a variety of techniques: they can be formulated as (1) water-emulsible or dispersible concentrates, in which the composition is confined with a suitable emulsifying or dispersing agent; optionally, the formulation can contain a suitable solvent for the composition; (2) liquid based sprays containing an organic solvent or mixture of solvents; (3) aerosols; (4) baits containing an attractant such as food, or a pheromone; (5) dusts, powders or granules. It is thus evident that the composition alone can be applied to control insects, or the composition plus any desired other material or materials can be used.

A composition of this invention can be used to kill insects by applying the composition to a locus that the insects will contact, or closely, approach, in the case of a volatile insecticide. Thus the composition can be applied to a surface to protect that surface from attack by insects or it can be applied to a surface bounding or located within an area or volume to be protected. The compositions can be used on any common surface, such as wood, metal, cloth, concrete, plaster, etc. commonly associated with fences and such buildings as pens, sheds, barns, houses, and the like, where common insect pests are a problem. The compositions can also be sprayed or dusted on animals, crops, etc. and can be used in or on soil. Further, it has been found that the compositions may be applied to water to control insects, for example, mosquito larvae, therein. Also, since some of the organophosphorus insecticides contemplated by the invention are known to be effective anthelmintics for controlling parasites in the gastrointestinal tract of warm blooded animals, compositions of such anthelmintics according to the present invention can be used to control parasites in warm-blooded animals — for example, a composition can be administered in the food and/or drinking water of warm-blooded animals, such as domestic animals, pets and animals grown for their fur or hide and/or meat.

One convenient way to formulate the resin/insecticide composition is to bring the resin and insecticide together in a mutual solvent and maintain that solution until the composition is to be applied, or if used to form a powder, by spraying such a solution into a chamber to effect volatilization of the solvent and collecting the resulting powder or dust.

In some cases, the ingredients can simply be mixed to form the composition, which then can be converted to the desired physical shape and form.

When used as dusts, the compositions can be applied as with sprays or may be used in dust bags. Both dusts and granules may be used in baits, placed in areas or passageways known to be used by insects, or applied to or into soil for the control of soil-dwelling insects, or introduced into water to control insects therein, or into the feed and/or water of warm-blooded animals to control internal parasites.

Solutions useful for spraying can be prepared using any of the well-known inert pesticidal solvent carriers or mixtures thereof. Examples of such carriers include petroleum fractions of intermediate viscosity and volatility such as kerosene, diesel oil, coal tar oil and other light mineral oil distillates. Oils of animal and vegetable origin may also be used as may hydrocarbons such as toluene, xylene, naphthalene, and alkylated naphthalenes. Other organic liquids of appropriate volatility such as alcohols, ketones and chlorinated hydrocarbons may also be useful. Examples of organic solvents include cyclohexanol, cyclohexanone acetone, methyl ethyl ketone, methylene chloride, tetrachlorethane, trichloroethylene, and tri- and tetrachlorobenzene. In some cases, mixtures of these solvents may be found to be superior to the individual solvents.

In general, it will be found desirable to use a solvent that is relatively highly volatile. When a droplet of the resin/insecticide composition is a solvent, i.e., a solution, is deposited on a porous or rough surface, it is mobile and can penetrate such a surface. The amount of the resin/insecticide composition remaining at the surface where it is most effective, depends upon (and is roughly inversely related to) the depth the droplet penetrates. The degree of penetration tends to be less (and the surface deposit more) the more volatile the solvent. During passage between the sprayer and the surface, and before penetration into the surface, the solution loses some of the solvent by evaporation, the liquid volume of the droplet decreasing, and the fluidity of the composition decreasing, reducing the penetration of the solvent into the surface. Therefore, the greater the solvent volatility, the higher the surface deposit. For this reason, and because of their ready availability, light aromatic solvents such as benzene, toluene, the xylenes and other alkyl benzenes are among those preferred.

Of course, liquids that are not solvents for the insecticides may be used to advantage in some applications either alone or in combination with one or more solvents and/or other adjuvants as disclosed herein.

In the preparation of sprays, whether solvent based on emulsifiable concentrates, it may be desirable and even necessary to add adjuvants such as a spreading, wetting, emulsifying or dispersing agent. Materials that can be used may be non-ionic, anionic or cationic such as fatty-acid soaps, rosin salts, saponins, gelatin, casein, long-chain fatty alcohols, alkylaryl sulfonates, long-chain alkyl sulfonates, ethylene oxide condensates, long-chain amines and ammonium salts, phosphate ester complexes and the like. Typical non-ionic products include condensation products of aliphatic alcohols, amines and carboxylic acids with ethylene oxide. Examples include polyoxyethylene sorbitan monolaurate, -monooleate, -tristearate, and -trioleate; octyl phenoxy polyethoxyethanol; and oleylamine ethylene oxide condensate.

Anionic products that may be used are the free acids of complex organic phosphate esters, the sodium salt of dodecylbenzenesulfonic acid, petroleum sulfonates such as sodium lignosulfonate and sodium lauryl sulfonate.

Cationic products such as quaternary ammonium compounds, e.g., alkyl pyridinium halide and alkyl ammonium halides may also be used.

The weight ratio of resin to insecticide in the compositions of this invention will normally vary from about 10:1 to 0.3:1 with ratios of about 8:1 to 1:1 being preferred for insect control. For use as anthelmintics, a resin/insecticide weight ratio of from about 0.4:1 to about 1:1 will be found to be suitable.

In normal use formulations of the compositions of this invention, prior to application, may contain an insecticide content of from as low as about 0.1% by weight to as high as is practical. Generally the upper limit need not surpass about 70% by weight. The resin/insecticide composition can be shipped as a concentrate in an organic solvent along with any desired adjuvants and then diluted with water if used as an emulsifiable concentrate or with additional solvent as desired for spraying.

Concentrates will normally contain about 45–70% by weight of the resin/insecticide composition dissolved in about 28–53% of an organic solvent and additionally containing from about 2 to 10%w of an emulsifying or dispersing agent.

The formulations may be applied with conventional spray equipment.

Because of the slow release of the insecticide, surfaces that have been treated according to the invention remain toxic to insects thereon over an extended period of time, which may vary depending upon climatic conditions such as temperature and humidity. Insecticide/resin compositions of this invention have remained active over a period extending from a few days to several months. As previously explained these compositions are resistant to hydrolysis when the surface becomes wet by humidity, rain, hosing down of barn walls, etc. Similarly, compositions of this invention when applied to water slowly release the insecticide to control insects in the water, and when administered orally to a warm-blooded animal, slowly release the insecticide to kill worms in the gastro-intestinal tract.

Additional advantages which may be attributed to this invention lie in their safety. The resin enables application of an effective dosage of an insecticide without hazard to persons or animals in or about a locus to be protected — the composition releases the insecticide at a rate which effectively kills insects, but which is so slow that the amount of free insecticide available for contact by a person or animal at a given moment is not toxic to the person or animal. Thus acute dermal toxicity studies on rats utilizing DDVP as the toxicant showed that the terpene phenol resin decreased the dermal toxicity of DDVP by about tenfold.

The compositions of the present invention are effective in the control of all invertebrate pests which organophosphorus pesticides are generally known to control. While these pests are generally referred to as "insects" they are inclusive of other invertebrate pests which are not true "insects" but are commonly designated as such. Thus the compounds of this invention may be used in the control of flies, mosquitoes, moths, worms, caterpillars, weevils, beetles, ticks, mites, spiders, cockroaches and the like. Also, the compositions may be used to control endoparasitic helminths which certain of the organophosphorus insecticides of this invention are known to control.

If desired, the compositions of this invention can include other ingredients such as dyes, pheromones, baits and the like. Also mixtures of one or more organophosphorus insecticides may be used as may mixtures of an organophosphorus insecticide and other insecticides, or pesticides such as herbicides.

The invention is illustrated by the following examples:

EXAMPLE I

Compositions suitable for direct application as aerosols were formulated by dissolving the various components in a mixture of methylene chloride and 1,1,1-trichloroethane thereby forming a mixture which was then put in aerosol containers and pressurized with hydrocarbon gas to give the following compositions.

| Component | A % wt. | B % wt. |
|---|---|---|
| DDVP | 0.75 | 0.75 |
| NIREZ 2019[1] | 1.25 | 6.00 |
| Methylene chloride | 60.00 | 55.25 |
| 1,1,1-trichloroethane | 23.00 | 23.00 |
| Hydrocarbon propellant[2] | 15.00 | 15.00 |

[1] Terpene phenol resin, sold by the Newport Division of Reichhold Chemicals, Inc., softening point (ring and ball method) about 122°C; phenolic hydroxyl value: approximately 0.21 equivalent per 100 grams; molecular weight, approximately 620.
[2] 55% isobutane, 45% propane

EXAMPLE II

A composition suitable for use as a scatter bait insecticide was formulated by blending together the following components in the amounts indicated:

| Component | % wt. |
|---|---|
| DDVP | 0.55 |
| Terpene Phenol Resin (NIREZ 2019) | 3.00 |
| Oil Red Dye | 0.01 |
| Dicalite 476 (diatomaceous earth) | 2.00 |
| Coarse granulated sugar | 94.44 |

EXAMPLE III

The bait composition of Example II was tested by placing 50 mg samples of bait in uncovered petri dishes and periodically placing the uncovered dishes in 1 cubic foot wire cages containing 100 flies for a 24 hour period. The temperature was maintained at 80°F, ordinary room humidity. A milk sop was provided for food for the flies. The number of dead flies was counted at 1, 3, 5 and 24 hour intervals after introduction of the sample into the cage as indicated in Table I.

EXAMPLE IV

Compositions suitable for use as emulsifiable concentrates were formulated by mixing together the ingredients in the following proportions.

| Component | % wt. |
|---|---|
| a. DDVP | 11 |
| Terpene Phenol Resin (NIREZ 2019) | 33 |
| Dioctyl phthalate | 4 |
| Emulsifier (GAFAC RE 610)[1] | 6 |
| Toluene | 46 |
| b. DDVP | 24 |
| Terpene Phenol Resin (NIREZ 2019) | 36 |
| GAFAC RE-610 | 6 |
| Xylene | 34 |
| c. DDVP | 12 |
| Terpene Phenol Resin (NIREZ 2019) | 36 |
| GAFAC RE-610 | 6 |
| Toluene | 46 |
| d. DDVP | 24 |
| Terpene Phenol Resin (NIREZ 2019) | 36 |
| GAFAC RE-610 | 6 |
| Benzene | 34 |

[1] Free acid of complex organic phosphate ester.

EXAMPLE V

Plywood panels (4 ft² each) were brush coated with lime whitewash and allowed to dry under ambient conditions for two days. The compositions of Example IV-b and IV-c were diluted with water to form an emulsion containing 1% DDVP. Duplicate panels for each sample were sprayed with the emulsion so that each contained 50 mg DDVP/ft² of panel. After drying under ambient laboratory conditions the panels were removed from the laboratory and placed in a large open lath house. One set from each sample was placed so that the panels received direct sunlight through the laths covering the roof of the building. A second set was placed under some tables in the building so that the panels received very little direct sunlight. The panels were returned to the laboratory at weekly intervals for testing against house flies. Two replicates of 25 house flies (*Musca domestica*) in screened cages were placed on each panel and exposed to the surface continuously for 24 hours. Milk pads were placed on the screen cages for food during exposure. At the end of the 24 hour exposure period fly mortality counts were made with the results set out in Table II.

EXAMPLE VI

Plywood panels were whitewashed as in Example V. Duplicate sets of Portland cement concrete blocks and whitewashed panels of 36 in² area were sprayed with water diluted emulsions of Exaples IV-b and IV-d containing 1% DDVP. The areas sprayed contained about 100 mg/ft² of DDVP. After drying for one day 25 house flies (*Musca domestica*) in screen cages were placed on the blocks and panels. A milk pad was placed on the cages for food. After 24 hours of exposure the cages were removed and the number of dead flies counted. The blocks and panels were maintained in a small room at 85°–88°F and 85–90% relative humidity. The blocks and panels were removed from this environment at intervals and tested in the laboratory as described in Example V.

The results of testing are set out in Table III.

EXAMPLE VII

Plywood panels were whitewashed as in Example V. Duplicate sets of Portland cement concrete (PCC) blocks and whitewashed (WW) panels of 36 in² area were sprayed with water diluted emulsions of various organophosphorus insecticides as given in the table below. The areas sprayed contained about 50 mg/ft² of the insecticide. Table IV reports the results. The undiluted formulation of each insecticide is given. The resin used was NIREZ 2019. Unless otherwise indicated, the solvent was xylene. The emulsifier was GAFAC RE 610.

The insecticides tested were:
1. Malathion, S-[1,2-di(ethoxycarbonyl)ethyl]-dimethylphosphorothiolothionate (Class 2), as a commercial technical product, purity unknown.
2. Naled, dimethyl 1,2-dibromo-2,2-dichloroethyl phosphate (Class 3), as a technical product, 92% naled, 0.5% DDVP.
3. SD 30040, O-(2,2-dichlorovinyl) O,O-dimethyl phosphorothionate (Class 1), as a technical product, 94% SD 30040, 1.4% DDVP.
4. Methyl parathion, O,O-dimethyl O-p-nitrophenyl phosphorothioate (Class 8), as a technical product, 80% methyl parathion.
5. Chlorfenvinphos, 2-chloro-1-(2,4-dichlorophenyl)-vinyl diethyl phosphate (Class 4), as a technical product, 95% beta and alpha isomers, (10:1 ratio)
6. Crotoxyphos, 1-methylbenzyl 3-(dimethoxyphosphinyloxy)-cis-crotonate (Class 5), as a technical product, 85% crotoxyphos.
7. Dichlorvos (DDVP), dimethyl 2,2-dichlorovinyl phosphate (Class 1), as a technical product, 96.5% DDVP, 1% trichlorphon.
8. Dimethoate, O,O-dimethyl S-(N-methylcarbamoylmethyl)-phosphorodithioate (Class 6), as a commercial technical product, 95% dimethoate.
9. Monocrotophos, cis-3-(dimethoxyphosphinyloxy)-N-methylcrotonamide (Class 7), as a technical product, 81.8% monocrotophos.
10. Mevinphos, 2-methoxycarbonyl-1-methylvinyl dimethyl phosphate (Class 9), as a technical product, 65.3% alpha isomer of mevinphos.

TABLE I

| Sample | Initial | | | | 1 day | | | | 3 days | | | | 1 week | | | | 2 weeks | | | | 3 weeks | | | | 4 weeks | | | |
|---|---|---|---|---|---|---|---|---|---|---|---|---|---|---|---|---|---|---|---|---|---|---|---|---|---|---|---|---|
| | \multicolumn{28}{c}{Percent fly mortality after indicated hours of exposure} |
| | 1 | 3 | 5 | 24 | 1 | 3 | 5 | 24 | 1 | 3 | 5 | 24 | 1 | 3 | 5 | 24 | 1 | 3 | 5 | 24 | 1 | 3 | 5 | 24 | 1 | 3 | 5 | 24 |
| A[1] | 12 | — | 63 | 96 | — | — | — | — | 1 | 19 | 59 | 99 | — | 32 | 77 | 99 | — | — | 95 | 100 | — | — | — | — | — | — | — | 99 |
| B[2] | — | — | — | — | — | — | — | — | 0 | 10 | 66 | 99 | — | 71 | 83 | 100 | — | — | 92 | 100 | — | — | — | — | — | — | — | 99 |
| C[2] | — | — | — | — | — | — | — | — | — | 29 | 48 | 94 | — | 58 | 75 | 95 | — | 47 | 60 | 96 | — | 23 | 59 | 88 | — | 18 | — | 90 |
| D[2] | 1 | 16 | 23 | 62 | 3 | 31 | 50 | 95 | — | — | — | — | 3 | 31 | 55 | 90 | 16 | 38 | 55 | 96 | 1 | 36 | 47 | 82 | 2 | 44 | 70 | 95 |

[1] Stored in a storage chamber at 95°F and 80% relative humidity.
[2] Stored in open environment.

TABLE II

| Composition | Exposure | Fly Mortality %[a] Week | | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Example IV-b | Sun | 100 | 94 | 6 | — | — | — | — | — | — | — | — | — | — | — |
| " | Shade | 98 | 100 | 100 | 100 | 100 | 100 | 100 | 100 | 100 | — | 20 | 52 | 17 | — |
| Example IV-c | Sun | 96 | 100 | 12 | — | — | — | — | — | — | — | — | — | — | — |
| " | Shade | 84 | 98 | 98 | 100 | 100 | 100 | 62 | 66 | 68 | — | 50 | 64 | 51 | 19 |

[a] Average of two tests.

TABLE III

| Composition | Surface Treated | % Fly Mortality at Test Week | | | | | | | | |
|---|---|---|---|---|---|---|---|---|---|---|
| | | 0 | 1 | 2 | 4 | 7 | 9 | 11 | 17 | 23 |
| Control | PCC[1] | 0 | 0 | 0 | 0 | 0 | 0 | 0 | 0 | 0 |
| | WW[2] | 0 | 0 | 0 | 0 | 0 | 0 | 0 | 0 | 0 |
| Example IV-b | PCC | 100 | 100 | 100 | 100 | 100 | 100 | 98 | 90 | 96 |
| | WW | 100 | 100 | 86 | 22 | 12 | 0 | — | — | — |
| Example IV-d | PCC | 100 | 100 | 100 | 100 | 100 | 98 | 98 | 96 | 100 |
| | WW | 100 | 100 | 100 | 100 | 52 | 0 | — | — | — |

[1] Precast concrete blocks
[2] Whitewashed plywood panels

TABLE IV

| ORGANO PHOSPHATE | % Wt. Composition | | | | Type Panel |
|---|---|---|---|---|---|
| | Phosphate | Resin | Solvent | Emulsifier | |
| Malathion | 24 | 12 | 57 | 7[1] | WW |
| | 24 | 12 | 57 | 7 | PCC |
| | 24 | 36 | 34 | 6 | WW |
| | 24 | 36 | 34 | 6 | PCC |
| | 25 | — | 69 | 6 | WW |
| | 25 | — | 69 | 6 | PCC |
| Naled | 25 | 12 | 57 | 6 | WW |
| | 25 | 12 | 57 | 6 | PCC |
| | 24 | 36 | 34 | 6 | WW |
| | 24 | 36 | 34 | 6 | PCC |
| | 25 | — | 69 | 6 | WW |
| | 25 | — | 69 | 6 | PCC |
| SD 30040 | 25 | 12 | 57 | 6 | WW |
| | 25 | 12 | 57 | 6 | PCC |
| | 25 | 36 | 33 | 6 | WW |
| | 25 | 36 | 33 | 6 | PCC |
| | 25 | — | 69 | 6 | WW |
| | 25 | — | 69 | 6 | PCC |
| Methyl Parathion | 24 | 36 | 34 | 6 | WW |
| | 24 | 36 | 34 | 6 | PCC |
| | 24 | — | 70 | 6 | WW |
| | 24 | — | 70 | 6 | PCC |
| Chlorfenvinphos | 24 | 36 | 34 | 6 | WW |
| | 24 | — | 70 | 6 | WW |
| Crotoxyphos | 24 | 36 | 34 | 6 | WW |
| | 24 | — | 70 | 6 | WW |
| Dichlorvos | 24 | 35 | 35[2] | 6 | WW |

TABLE IV – Continued

| ORGANO PHOSPHATE | % Wt. Composition Phosphate | Resin | Solvent | Emulsifier | Type Panel |
|---|---|---|---|---|---|
| | 24 | 35 | 35[2] | 6 | PCC |
| | 24 | 35 | 35 | 6 | WW |
| | 24 | 35 | 35 | 6 | PCC |
| | 24 | — | 65 | 11[3] | WW |
| | 24 | — | 65 | 11[3] | PCC |
| Dimethoate | 18 | 27 | 49[4] | 6 | WW |
| | 18 | 27 | 49[4] | 6 | PCC |
| | Commercial Cygon Insecticide 2.67 lb/gallon emulsifiable concentrate manufactured by American Cyanamide Co. | | | | WW |
| | | | | | PCC |
| Monocrotophos | 12 | 18 | 64 | 6 | WW |
| | 12 | 18 | 64 | 6 | PCC |
| | 12 | — | 85[5] | 6 | WW |
| | 12 | — | 82[5] | 6 | PCC |
| Mevinphos | 12 | 18 | 64 | 6 | WW |
| | 12 | — | 82 | 6 | WW |

| ORGANO PHOSPHATE | % HOUSEFLY MORTALITY AFTER - WEEKS | | | | | | | | | | | | | | | | |
|---|---|---|---|---|---|---|---|---|---|---|---|---|---|---|---|---|---|
| | 1/7 | 1 | 2 | 3 | 4 | 5 | 6 | 7 | 8 | 9 | 10 | 11 | 12 | 13 | 14 | 15 | 16 |
| Malathion | 48 | 0 | — | | | | | | | | | | | | | | |
| | 100 | 44 | — | | | | | | | | | | | | | | |
| | 36 | 0 | — | | | | | | | | | | | | | | |
| | 100 | 92 | 88 | 84 | 24 | | | | | | | | | | | | |
| | 60 | 0 | — | | | | | | | | | | | | | | |
| | 100 | 12 | 0 | | | | | | | | | | | | | | |
| Naled | 20 | 0 | — | | | | | | | | | | | | | | |
| | 100 | 100 | 100 | 96 | 92 | 76 | 76 | 88 | 4 | — | | | | | | | |
| | 96 | 100 | 100 | 100 | 96 | 48 | 84 | 52 | 64 | 44 | 12 | 4 | — | | | | |
| | 100 | →100 | 96 | 100 | 100 | 100 | 96 | 100 | | | | | | | | | |
| | 24 | 0 | — | | | | | | | | | | | | | | |
| | 96 | 0 | — | | | | | | | | | | | | | | |
| SD 3004O | 100 | 0 | — | | | | | | | | | | | | | | |
| | 100 | 100 | 84 | 20 | 0 | — | | | | | | | | | | | |
| | 100 | →100 | 72 | 36 | 100 | 100 | 100 | | | | | | | | | | |
| | 100 | →100 | 96 | 92 | 100 | 100 | 100 | | | | | | | | | | |
| | 100 | 0 | — | | | | | | | | | | | | | | |
| | 100 | 0 | — | | | | | | | | | | | | | | |
| Methyl Parathion | 100 | →100 | 36 | 64 | 32 | 16 | — | | | | | | | | | | |
| | 100 | →100 | 72 | 60 | 92 | 100 | 52 | 96 | | | | | | | | | |
| | 100 | →100 | 60 | 9 | — | | | | | | | | | | | | |
| | 100 | 100 | 80 | 100 | 8 | — | | | | | | | | | | | |
| Chlorfenvinphos | 100 | →100 | 92 | 60 | 100 | 100 | | | | | | | | | | | |
| | 96 | 58 | 8 | 68 | 60 | 64 | 8 | 0 | — | | | | | | | | |
| Crotoxyphos | 76 | 80 | 0 | 4 | — | | | | | | | | | | | | |
| | 0 | 8 | 0 | 0 | — | | | | | | | | | | | | |
| Dichlorvos | 88 | 92 | 0 | 28 | — | | | | | | | | | | | | |
| | 100 | →100 | 88 | 96 | 52 | 36 | 136 | 100 | — | 92 | | | | | | | |
| | 80 | 88 | 92 | 94 | 74 | 28 | — | | | | | | | | | | |
| | 100 | →100 | 96 | 100 | 100 | 100 | | | | | | | | | | | |
| | 0 | 0 | 0 | 0 | — | | | | | | | | | | | | |
| | 0 | 0 | 0 | 0 | — | | | | | | | | | | | | |
| Dimethoate | 100 | 100 | 100 | 96 | 68 | 0 | — | | | | | | | | | | |
| | 100 | 100 | 100 | 76 | 100 | 16 | 44 | 16 | 12 | 4 | — | | | | | | |
| | 100 | 60 | 28 | — | | | | | | | | | | | | | |
| | 100 | 100 | 100 | 86 | 96 | 24 | 68 | 44 | 20 | 16 | — | | | | | | |
| Monocrotophos | 12 | 52 | 0 | 36 | — | | | | | | | | | | | | |
| | 100 | | | | 100 | 36 | 80 | 28 | 12 | — | | | | | | | |
| | 0 | 32 | 0 | 0 | — | | | | | | | | | | | | |
| | 100 | 68 | 4 | 36 | 60 | 24 | 56 | 4 | 4 | — | | | | | | | |
| Mevinphos | 96 | 28 | 28 | 60 | 8 | — | | | | | | | | | | | |
| | 52 | 0 | 0 | — | | | | | | | | | | | | | |

1. Anionic-nonionic blend of oil-soluble sulfonates with polyoxyethylene ethers and free acid of a complex organic phosphate ester.
2. Cyclo-Sol solvent.
3. Anionic-nonionic blend.
4. 25.5% xylene/23.5% methylene chloride.
5. 59% xylene/20% methylene chloride.
6. Percent active insecticide named.

EXAMPLE VIII

An emulsifiable concentrate of mevinphos was prepared as follows:

240 g of PHOSDRIN Insecticide (63% alpha-isomer of mevinphos), 360 g of Nirez 2019 and 80 g of GAFAC RE610 were mixed with sufficient xylene to form 1 liter of the mixture.

Portions of this emulsible concentrate (hereinafter designated as Formula A) were diluted with different amounts of water and the resulting mixtures were sprayed on potted cotton plants, which then were held at ambient conditions. At intervals thereafter leaves were removed and infested with houseflies in a screened petri dish supplied with food for the flies. The effect of the toxicant on the flies were noted after 24 hours exposure. At intervals, leaves were removed, their stems placed through holes in small platforms into beakers of water and the leaves were infested with corn earworm larvae. The effect of the toxicant on the larvae was noted after 48 hours exposure. For comparison, a commercial emulsible concentrate formulation of mevinphos containing no resin (hereinafater designated as Formula B) was tested in the same way. The results are summarized in Table V.

(4) 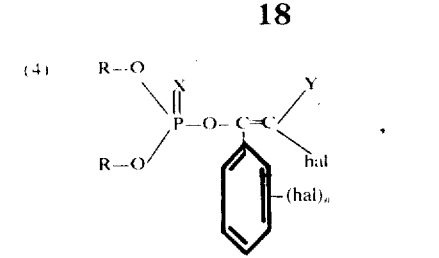

(5) 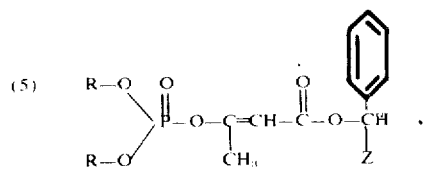

(6) 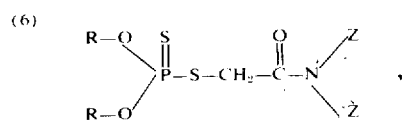

(7) 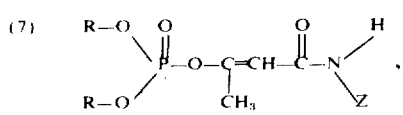

TABLE V

| Test No. | Formula | Dosage[1] | Percent mortality of test insect in contact with leaves of indicated age (hours) after spraying | | | | | | | |
|---|---|---|---|---|---|---|---|---|---|---|
| | | | Houseflies | | | | Corn Earworms | | | |
| | | | 0 | 4 | 24 | 48 | 0 | 4 | 24 | 48 |
| 1 | B | 0.25 | 85 | 3 | 0 | 0 | 0 | 10 | 0 | 0 |
| 2 | B | 0.50 | 88 | 36 | 21 | 4 | 50 | 30 | 20 | 0 |
| 3 | B | 1.0 | 100 | 30 | 74 | 9 | 70 | 70 | 40 | 20 |
| 4 | A | 0.25 | 100 | 54 | 60 | 72 | 30 | 60 | 50 | 50 |
| 5 | A | 0.50 | 100 | 85 | 95 | 96 | 60 | 50 | 60 | 70 |
| 6 | A | 1.0 | 100 | 100 | 100 | 98 | 80 | 90 | 70 | 80 |
| 7 | None-Control | | 0 | | 1 | — | 0 | | — | |

[1] Pounds of active ingredient per acre

What is claimed is:

1. An insecticidal composition comprising an insecticidally effective amount of an organophosphorus compound selected from the group consisting of:

(1) 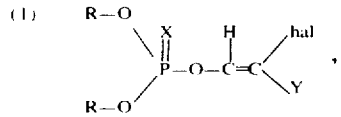

(2) 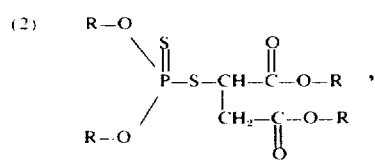

(3) 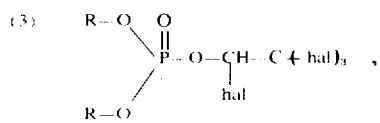

(8) 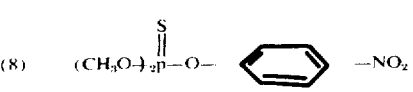

and (9) 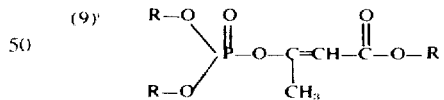

wherein each R, which may be the same or different, is alkyl of from one to four carbon atoms, X is oxygen or sulfur, Y is hydrogen or middle halogen, Z is hydrogen or alkyl from one to four carbon atoms, "hal" is middle halogen, and $n$ is 2 or 3, in intimate admixture with a terpene phenol resin, having a softening point of at least 100°C, a phenolic hydroxy value of from about 0.14 to about 0.21 equivalent per 100 grams of resin and a molecular weight of about 620, the weight ratio of resin to insecticide being in the range of from about 8:1 to about 1:1.

2. A composition according to claim 1 wherein the insecticide is one having formula (1), each of R is methyl, X is oxygen, "hal" is chlorine and Y is chlorine.

and the resin has a softening point of about 122°C, a phenolic hydroxyl value of about 0.21 equivalent per 100 grams of resin, and a molecular weight of about 620.

3. A method for protecting a locus from insects which comprises providing at said locus an insecticidally effective amount of the composition of claim 1.

4. A method for protecting a locus from insects which comprises providing at said locus an insecticidally effective amount of the composition of claim 2.

* * * * *